United States Patent Office 2,773,103
Patented Dec. 4, 1956

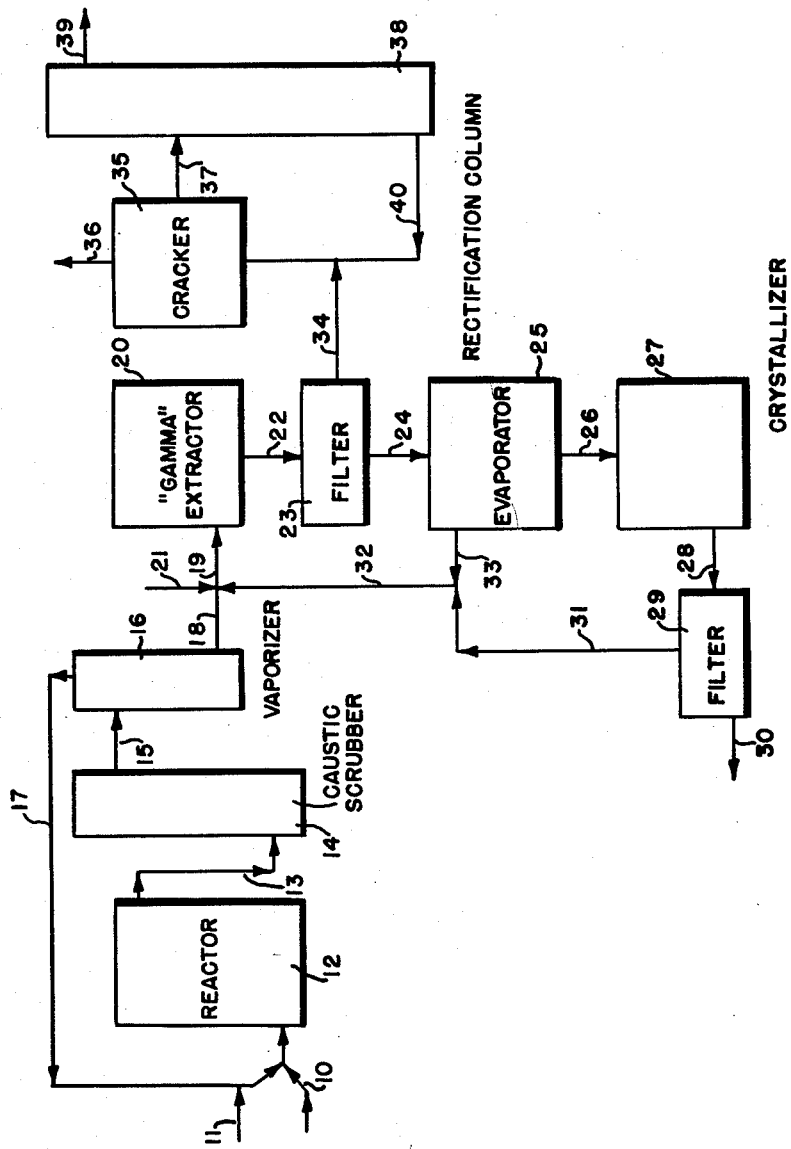

2,773,103

ENHANCEMENT OF GAMMA BENZENE HEXACHLORIDE CONTENT

George Calingaert, Geneva, N. Y., assignor to Ethyl Corporation, New York, N. Y., a corporation of Delaware Original application December 24, 1949, Serial No. 135,022. Divided and this application May 5, 1953, Serial No. 353,081

7 Claims. (Cl. 260—648)

This invention relates to an integrated process for making gamma benzene hexachloride and trichlorobenzene from chlorine and benzene. This application is a division of my co-pending application Serial No. 135,022, filed December 24, 1949, now abandoned.

A mixture of isomers of benzene hexachloride including a relatively small quantity of the gamma isomer, has been used for a number of years as an insecticide. The mixture of isomers has certain disadvantages not obtained when the gamma isomer of benzene hexachloride is used alone. Thus a substantially pure gamma isomer known as "lindane" is becoming an important commercial insecticide. The other isomers of benzene hexachloride both have practically no potency as insecticides and are objectionable from the standpoint of odor and other undesirable properties. Thus, the non-gamma isomers have had very little value. However, by the process of my invention, the non-gamma isomers are cracked; either thermally or catalytically, to a substantially pure trichlorobenzene, a valuable product since it is an outstanding scavenger for use in leaded gasoline, as disclosed in U. S. Patent 2,479,903. The purity of trichlorobenzene is important to its scavenging properties and although trichlorobenzene can be made by the direct chlorination of benzene, undesirable by-products such as tetrachlorobenzene are produced which must be separated and have practically no salvage value.

It is therefore an object of my invention to produce from benzene and chlorine a substantially pure gamma benzene hexachloride and a substantially pure trichlorobenzene.

I accomplish this object by reacting chlorine and benzene preferably in the presence of actinic light whereby a mixture of isomers of benzene hexachloride is formed. From such mixture the gamma isomer is separated from the non-gamma isomers, the latter being then converted to a substantially pure trichlorobenzene by cracking.

My invention can be best understood by referring to the drawing which is a schematic flow diagram illustrating the process of my invention. Chlorine is charged through line 10 and benzene through line 11 to the reactor 12. In the reactor 12 are daylight fluorescent lights which photochemically convert the chlorine and benzene to benzene hexachloride. The reactor 12 is maintained under substantially atmospheric pressure or under a pressure sufficient to force the reaction products through the system. The temperature in the reactor is preferably maintained between about 40° C. and 60° C.

The reaction products pass from the reactor 12 through line 13 to the caustic scrubber 14 in which is removed traces of unreacted chlorine and any hydrogen chloride formed in the reactor. From the caustic scrubber 14 the mixture of benzene hexachloride and unreacted benzene pass through line 15 to the vaporizer 16. The vaporizer 16 is maintained at such a temperature that the unconverted benzene is removed overhead through line 17. Recycle benzene is blended with the incoming fresh benzene through line 11 and recharged to the reactor 12. The benzene hexachloride containing the various isomers is removed from the bottom of vaporizer 16 through line 18, mixed with a solvent selective to the gamma isomer, and the mixture charged through line 19 to the gamma extractor vessel 20, the solvent being charged through line 21. The vessel 20 serves to give the gamma isomer time to go into solution and is maintained under substantially atmospheric pressure and at a temperature of between approximately 15° C. and 25° C.

While I preferably use a solvent extraction method for separating the gamma isomer from the non-gamma isomers, other separation methods can be used within the scope of my invention. Furthermore, while I prefer to separate all the gamma from the non-gamma, it is not always advantageous to do so and therefore a certain amount of the gamma isomer may be charged along with the non-gamma isomer to the cracking stage. I prefer to use as the solvent one of the lower alcohols such as methyl, ethyl or propyl although other solvents may be used such as benzene, trichlorobenzene, lower alkyl acetates and lower alkyl ethers.

The solution of solvent and gamma isomer together with precipitated non-gamma isomers and some undissolved gamma isomers are discharged from the extractor 20 through line 22 to a conventional filter 23. From the filter 23, the filtrate containing the gamma isomer passes through line 24 to the evaporator 25 maintained at a temperature of between 80° and 100° C., in which the solvent is separated from the gamma isomer. The gamma isomer leaves the evaporator 25 through line 26 and passes to the crystallizer vessel 27 which is of conventional design. From the vessel 27 the crystallized gamma benzene hexachloride discharges through line 28 to another filter 29 from which the relatively pure benzene hexachloride leaves in the form of a cake through line 30. The filtrate from the filter 29 containing solvent and unprecipitated benzene hexachloride is recycled through lines 31 and 32 to the gamma extractor 20. Also from the evaporator 25 solvent is removed through line 33 and recycled to the gamma extractor 20.

The filter cake from the filter 23 containing a small portion of gamma isomer but in the main containing non-gamma isomers is charged through line 34 to the cracker 35 in which hydrogen chloride is split off from the benzene hexachloride leaving trichlorobenzene. The hydrogen chloride is removed from the cracker 35 through line 3. The trichlorobenzene together with the unconverted benzene hexachloride and a relatively small portion of other chlorinated benzenes are discharged through line 37 to the rectifying column 38. This column is maintained under substantially atmospheric pressure at a temperature corresponding to the boiling point of trichlorobenzene, namely about 210° C. The trichlorobenzene produced is removed from the system through line 39 and the unconverted benzene hexachloride is recycled to the cracker 35 through line 40.

The cracking step may be either thermal or catalytic. When no catalyst is used, the temperature range is from about 500° to 600° C. If a catalyst such as ferric chloride is used, the temperature of the cracking step is maintained between 270° and 300° C.

My invention can be further understood by referring to the following working example in which the parts given are by weight: 30 parts of chlorine together with 10 parts of fresh benzene are charged to the reactor 12 in which the benzene is chlorinated in the presence of daylight fluorescent lights at a temperature of 50 C. The reaction products after passing through the scrubber, are separated in the vaporizer 16 into 90 parts of benzene, which is recycled to the reactor, and 40 parts of benzene hexachloride containing about 12 percent of the gamma isomer. To the 40 parts of benzene hexachloride, 10 parts of fresh methanol are added and the mixture charged to the gamma extractor maintained at a temperature of about 20° C. From the filter 23, 42 parts of filter cake are charged to the cracker 35 containing ferric chloride as the catalyst. At a conversion temperature of about 280° C. the benzene hexachloride mixture containing some gamma but mostly non-gamma isomers is converted to 24 parts of trichlorobenzene and 14 parts of hydrogen chloride. The conversion products from the cracker 35 are charged to the rectifying column 38 in which the top temperature is maintained at about 210° C. Twenty-four parts of trichlorobenzene of 97 percent purity are removed from the top of the rectifying column. The unconverted benzene hexachloride is recycled to the cracker. From the filter 23, 60 percent of the total gamma isomer formed in the reactor 12 together with the solvent medium are charged to the evaporator 25 maintained at 90° C. Following crystallization and filtering, 2 parts of gamma benzene hexachloride of 99 percent purity are removed from the filter 29. From the filter 29 and the evaporator 25 are recycled 70 parts of solvent to the gamma extractor 20.

The above working example and the description of the process in connection with the drawing are not intended to limit my invention but only to illustrate it.

I claim:

1. In a process for the production of a product containing an enhanced proportion of gamma benzene hexachloride by partially dissolving crude benzene hexachloride obtained from the additive chlorination of benzene in a solvent selected from the group consisting of lower aliphatic alcohols, benzene, trichlorobenzene, lower alkyl acetates and lower alkyl ethers, said solvent being employed in quantities sufficient to dissolve substantially all the gamma benzene hexachloride contained in said crude benzene hexachloride, separating the thereby formed solution from the undissolved solids and crystallizing a product containing an enhanced proportion of gamma benzene hexachloride from said solution, the improvement comprising recycling substantially all the solids and solvent of the mother liquor from said crystallization step to said partial dissolution step.

2. The process of claim 1 in which the solvent is a lower aliphatic alcohol.

3. In a process for the production of a product containing an enhanced proportion of gamma benzene hexachloride by partially dissolving in methanol at a temperature of about 15° to 25° C. crude benzene hexachloride obtained from the additive chlorination of benzene in the presence of actinic light, separating the thereby formed solution from the undissolved solids, concentrating the solution by removal of a portion of the methanol and crystallizing a product containing an enhanced proportion of gamma benzene hexachloride from said solution, the improvement comprising recycling substantially all the solids and methanol of the mother liquor from said crystallization step to said partial dissolution step.

4. The process of claim 1 wherein the selective solvent is methanol.

5. The process of claim 1 wherein the crystallization is effected by concentrating the gamma isomer containing solution.

6. The process of claim 1 in which the partial dissolution is carried out at a temperature between 15°–25° C.

7. In a process for the production of a product containing an enhanced proportion of gamma benzene hexachloride by partially dissolving crude benzene hexachloride obtained from the additive chlorination of benzene in a solvent selected from the group consisting of lower aliphatic alcohols, benzene, trichlorobenzene, lower alkyl acetates and lower alkyl ethers, said solvent being employed in quantities sufficient to dissolve substantially all the gamma benzene hexachloride contained in said crude benzene hexachloride, separating the thereby formed solution from the undissolved solids, crystallizing a product containing an enhanced proportion of gamma benzene hexachloride from said solution, and separating the crystals from the mother liquor, the improvement comprising recycling the mother liquor containing substantially all the solids present in the mother liquor resulting from the step of separating the crystals.

References Cited in the file of this patent

UNITED STATES PATENTS

| | | |
|---|---|---|
| 2,574,165 | Bender et al. | Nov. 6, 1951 |
| 2,708,681 | Vossen | May 17, 1955 |

FOREIGN PATENTS

| | | |
|---|---|---|
| 1,024,402 | France | Jan. 10, 1953 |